Sept. 8, 1959 M. LINK 2,903,118
MOTOR CONTROL FOR ELECTRICAL TYPEWRITERS
Filed March 3, 1958 2 Sheets-Sheet 1

INVENTOR
Manfred Link
BY
Michael S. Striker
ATTORNEY

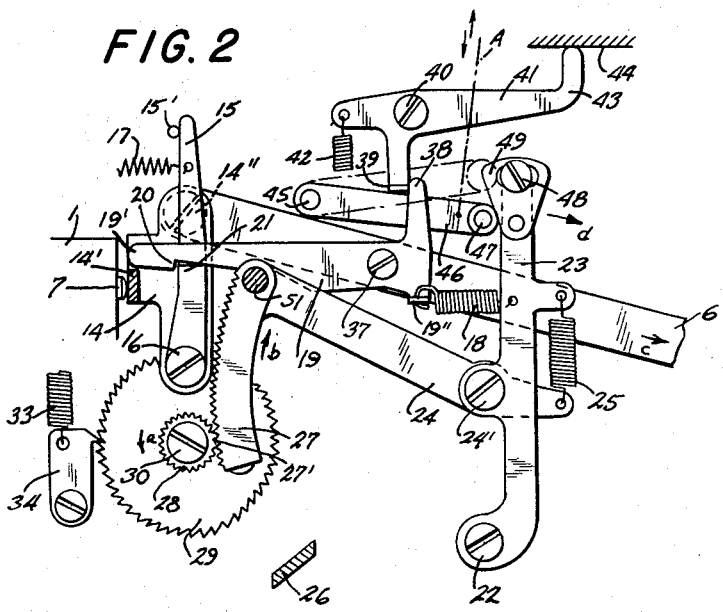

United States Patent Office 2,903,118
Patented Sept. 8, 1959

2,903,118

MOTOR CONTROL FOR ELECTRICAL TYPEWRITERS

Manfred Link, Nurnberg, Germany, assignor to Triumph Werke Nürnberg A.G., Nurnberg, Germany Application March 3, 1958, Serial No. 718,848

Claims priority, application Germany March 2, 1957

15 Claims. (Cl. 197—17)

The present invention relates to electrically operated office machines, and more particularly to a key-operated electric office machine, espeecially of the electric typewriter type.

Machines of this type include an electric drive motor and switch means movable between an open and a closed position for starting and stopping the motor. The motor serves to actuate the type levers upon operation of any one of the keys and/or to move the carriage or other component parts of the machine.

In machines of this kind it is quite undesirable if the motor is left running while the machine is not actually being used for a substantial period of time. Therefore, machines of the type set forth should be equipped with means that would automatically disconnect the motor when the machine is not being used.

However, it may easily occur that even after the regular motor switch has been placed in "off" position, one or more of the keys are accidentally or unintentionally operated in which case the actuating means between the keys and the motor are left in a position which would cause at least one of the type levers to hit either the platen, or stationary or a similar item placed on the platen, the moment the switch for the motor is closed again. This is quite inconvenient as it might mar the platen or the stationery. If more than one of the keys has been left in actuating position, then all the corresponding type levers would simultaneously be caused to hit whereby the types or the levers may be damaged.

Quite the same may occur if, for instance, the plug connecting the machine with the power supply has been pulled out of a supply socket while the motor switch was left in "on" position and if then the plug is again inserted into the socket.

Machines of the type set forth have been provided with key locking devices which automatically lock all the keys or at least a plurality thereof in their position of rest when the motor switch is moved to "off" position. This is accomplished by a mechanical connection between the switch and the locking device. An arrangement of this nature might be satisfactory whenever the operation of the motor is interrupted by intentionally moving the switch into "off" position. However, it would certainly fail in those cases where the motor is stopped by pulling the plug.

On account of this, attempts have been made to provide a safety mechanism including toothed gear trains and rotary members driven by said gear trains for disconnecting the motor some time after the supply of electricity to the machine has stopped. A device of this nature, however, is not satisfactory because a disagreeable noise is produced by the gear trains and because for certain reasons the time interval between the moment when the power supply is stopped and the moment when the motor circuit in the machine is interrupted, varies considerably from time to time.

It is a main object of the present invention to provide in a machine of the type set forth a safety arrangement which is free of all the disadvantages or weaknesses of the known devices.

It is another object of this invention to provide a safety arrangement which is capable of automatically interrupting the motor circuit a predetermined time after any one of the keys of the machine has been operated the last time.

It is a further object of this invention to provide a safety arrangement of the type set forth and which operates without any undesirable noise.

It is still a further object of this invention to provide a safety arrangement of the type set forth which includes means for automatically locking a plurality of keys in their respective position of rest simultaneously with the interruption of the motor circuit.

It is another object of the invention to provide a safety arrangement of the type set forth which is composed of comparatively simple mechanical parts which can be expected to give reliable and efficient service.

With above objects in mind the present invention essentially comprises, in an office machine operated by at least one key member and including an electric drive motor, in combination, circuit means including switch means connected for controlling the motor and movable between open and closed positions; actuating means for moving the switch means between said positions and including bias means for urging the switch into open position; detent means movable between a locking position and a not-locking position and operatively connected with the actuating means, for holding, when in locking position, the switch means in closed position against the action of the bias means; and release means for shifting the detent means into not-locking position. The release means include a releasing member movable between an idle position and a releasing position in which it shifts the detent means into not locking position, and drive means operatively connected for drive supply with the motor by said key member so as to continuously move the release member towards the releasing position as long as no key is operated, but to discontinue the moving of the release member whenever a key is operated before the detent means have been caused to move into the not-locking position causing the switch means to move into open position.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 2 is an elevation showing a portion of the mechanism illustrated in Fig. 1; and Fig. 3 is a perspective view of a part of the mechanism shown in Fig. 2 together with the pertaining drive means.

Figure 1:
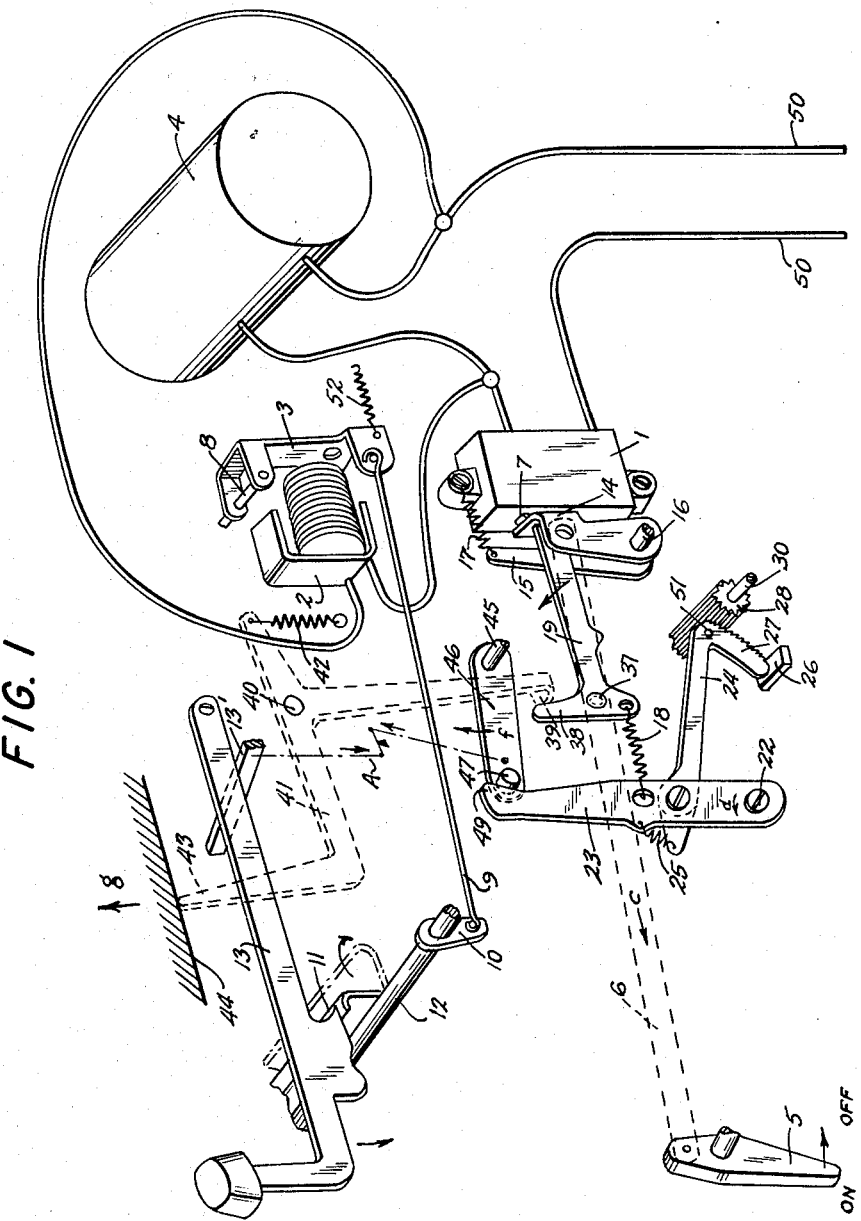
Fig. 1 is a diagrammatic perspective view illustrating the essential components of an embodiment of the invention.

It should be noted that in Figs. 1–3 the apparatus is shown in the position existing when the motor switch is in "on" position. However, Fig. 1 shows in addition the condition when a key has been operated but before the releasing action has started; Fig. 2 shows the condition when after the operation of a key time has passed and the releasing action is almost completed.

Referring now to Fig. 1, a motor 4 is connected by circuit means including two wires 50 and a switch 1 to a power line. A solenoid device 2, 3 which will be described further below is connected in parallel with the motor 4.

The switch 1 is equipped with a switch button 7 which in the usual manner is spring-controlled so that it has the tendency of moving outwards into the "off" position of the switch unless it is depressed in order to move the switch into its "on" position.

The switch 1 is associated with actuating means comprising a lever assembly 14 and 15 pivotally supported by a pivot screw 16, each of the levers 14 and 15 being able to turn independently on the pivot 16. Lever 14 has a transverse portion 14' shown in Fig. 2 in cross section which bears against the button 7. Pivotally linked to the lever 14 at 14'' is a push bar 6 which is pivotally connected at its outer end to a control lever 5 which is accessible from the outside of the machine. It can be seen from Figs. 1 and 2 that when the lower end of the control lever 5 is pushed in the direction of the arrow into "off" position the rod 6 is moved in the direction of arrow $c$ whereby the lever 14 and particularly its portion 14' is moved away from the button 7 permitting the switch 1 to move into "off" position. The lever 15 serves to establish an operative connection between the actuating means and a detent means mainly consisting of a lever 19 pivotally mounted at 37 on the rod 6. The lever 15 has a shoulder 21 aligned with the detent lever 19 which is provided correspondingly with a detent tooth 20 adapted to engage the shoulder 21 as shown in Fig. 2. The lever 15 is urged by a spring 17 in direction towards a stop pin 15' mounted in the body of the machine. The rear end of the detent lever 19, beyond the pivot 37, is provided with two extensions, one of which marked 38 is optional and only required in connection with the control device 40—44 described further below, while the other extension 19'' is engaged by one end of a spring 18 the function of which will be described in detail hereinbelow; at this point it is sufficient to understand that the spring 18 continuously urges the detent lever 19 towards the shoulder 21 of lever 15, and at the same time urges the rod 6 in direction of arrow $c$.

It is therefore clear that whenever the control lever 5 is moved into "on" position the rod 6 is moved in direction opposite to arrow $c$ and the button 7 is depressed by the transverse portion 14'. Simultaneously, the tooth 20 of the detent lever 19 slides over the shoulder 21 of lever 15 which is held by spring 17 in the position shown in Fig. 2, and the engagement of the tooth 20 with the shoulder 21 is maintained by the action of spring 18. Of course, the spring 17 must be assumed to be stronger than the spring 18 so that in this manner the whole actuating means and the switch 1 are held in "on" position.

On the other hand, if the control lever 5 is swung in the direction of the arrow into "off" position the rod 6 is moved in direction of arrow $c$ taking along with it the lever 14 and the detent lever 19. The latter moves the lever 15 against the action of spring 17 towards right as seen in Fig. 2, and during this movement the change of the angular positions of levers 14, 15 and 19 relatively to each other causes the tip 19' of the detent lever 19 to abut against the upper edge of the transverse portion 14' of lever 14 whereby the tooth 20 is forced out of engagement with the shoulder 21. This enables the lever 15 to snap back into contact with the stop pin 15' and removes the pull of spring 17 on the actuating means. Therefore, the switch 1 will now remain in "off" position. Whatever pulling power is still present in spring 18 at this moment will favor this condition of the switch 1 and of the actuating means. In order to automatically operate the actuating means depending upon other conditions present in the machine, e.g., a certain predetermined time after any one of the key members has been operated the last time, release means are provided as follows: a disengagement lever 23 is pivotally mounted at 22 in the machine and carries a tiltable lever 24 pivotally mounted at 24' on said disengagement lever 23. A spring 25 interposed between corresponding extensions of the levers 23 and 24, respectively, urges the tiltable lever 24 in counterclockwise direction as seen in Fig. 2. At its free end the tiltable lever 24 carries a release pin 51 which is located so that when the tiltable lever 24 is moved from the position shown in Fig. 1 against the action of spring 25 in clockwise direction into the position as shown in Fig. 2, it will abut against the lower edge of the detent lever 19, and if it is moved slightly beyond this position, the detent lever 19 will be moved from its locking position shown in Fig. 2 into its not-locking position by releasing the engagement between the tooth 20 and the shoulder 21. When this occurs the spring 18 will pull the rod 6 in direction of arrow $c$ so that the lever 14 moves away from the switch 1 and permits the latter to move into its "off" position.

The release means further comprise drive means illustrated partly in Figs. 1 and 2 and more completely in Fig. 3. Driving power is transmitted from the motor 4 by belt or similar means 36 to a pulley 35 mounted for rotation with a shaft 35' in the machine. A set of friction gears 31, 35'' constitutes a sort of gear train for transmitting a torque from the pulley 35 to the wheel 31. As can be seen in Fig. 3, the circumference of the friction gear 35'' is in frictional engagement with the shaft 35', and similarly the circumference of the friction wheel 31 is in similar engagement with the shaft of the wheel 35''. The friction wheel 31 is equipped with an excenter pin 31' to which is operatively connected a push bar 32 which is thereby caused to carry out reciprocating movements, its forward stroke being directed as indicated by arrow $e$. In the same plane as the push bar 32 is rotatably mounted a ratchet wheel 29 on a pivot 30 in the machine. A tooth 32' at the lower edge of rod 32 is adapted to engage with every forward stroke another one of the teeth of the ratchet wheel 29 so as to move the latter stepwise in the direction of rotation indicated by the arrow $a$. A retaining pawl 34 engages likewise the teeth of the ratchet wheel 29 and a spring 33 connecting the pawl 34 with the extreme end of rod 32 serves to hold both these members continuously in engagement with the teeth of the wheel 29. Fixed to the ratchet wheel 29 or to the common pivot 30 for joint rotation is a small wheel 28. The above-mentioned tiltable lever 24 has an arcuate extension 27 the outer edge of which is so positioned that it is capable of engaging in any position of the lever 24 the circumference of the small drive wheel 28. The contacting surfaces of the arcuate extension 27 and of the wheel 28 may carry corresponding teeth 27' or may be provided only with a coat of material ensuring good frictional engagement. In any case, at least the surface of drive wheel 28 is preferably coated with rubber unless the wheel is made entirely substantially of rubber or similar material.

It can be seen that as long as the motor 4 is operating the wheel 28 will be kept continuously in stepwise comparatively slow rotation in the direction of arrow $a$. As long as the extension 27 is kept in engagement with the drive wheel 28 the tiltable lever 24 and therefore the release pin 51 will be moved in direction towards the detent lever 19 and will move the latter into its not-locking position unless the engagement between the parts 27 and 28 is interrupted before the detent lever 19 is released.

As can be seen in Figs. 1 and 2 the upper end of the disengagement lever 23 can be moved, while the actuating means are in the position shown in Fig. 2, in the direction of arrow $d$, against the action of spring 18. It is clear that when the lever 23 is moved in this direction, the arcuate extension 27 is moved out of engagement with and drive wheel 28 and immediately returns into its position on stop 26 as shown in Fig. 1, under the action of spring 25.

In order to move the disengagement lever 23 in direction $d$ an actuating lever 46 is pivotally mounted at 45 in the machine and has at its free end preferably a small roller member 47 adapted to engage the free end of the disengagement lever 23. In a preferred embodiment of the invention this free end is equipped with an adjustable cam member 49 that can be set in suitable positions by means of a set screw 48. In Fig. 2 the actuating lever 46 is shown in its idle position in full lines. It can be moved upward into the release position shown in broken lines whereby through the engagement of roller 47 with cam 49 the lever 23 is forced in direction d.

The operation of the actuating lever 46 is derived from the operation of at least one, preferably of any one of the key members of the machine. Fig. 1 shows one key lever 13 which when operated would depress a machine element 13', preferably the ribbon transport device, so that this movement can be transferred by suitable mechanical means not shown in the drawing but symbolized by the dot-dash lines A, to the actuating lever 46, moving the latter with every stroke of the key lever 13 in the direction of arrow f.

It is therefore clear that when the switch 1 is in its "on" position and therefore the actuating means in the position of Figs. 1 and 2, and if the circuit means 50 are connected with the power line, the drive connection 27, 28 for the release means is interrupted with every stroke of any one of the key members of the machine; immediately thereafter, however, the engagement is re-established so that the detent means are moved into their not-locking position and the switch 1 is moved into "off" position after a period of time determined only by the travel of the pin 51 from its idle position into its release position; if, on the other hand, any one of the key members is operated before the end of this period of time then the travel of the release pin 51 is interrupted and the switch 1 remains in closed position.

With the above-described arrangement one object of the invention is reached, namely to ensure that the operation of the motor is automatically discontinued a predetermined time after any one of the key members of the machine has been operated the last time.

In order to comply with the other objects of this invention the mechanism described above is supplemented by means for automatically locking a plurality of key members of the machine in their idle position as soon as the supply of electricity to the motor is interrupted either by intentional move of the switch into "off" position or by accidental interruption of the power supply. As can be seen in Fig. 1 the above-mentioned solenoid 2 is equipped with an armature member 3 pivoting around a stationary pivot pin 8 and urged by a spring 52 in a direction away from the solenoid 2. The outer end of the armature 3 is connected by a pull rod 9 and a bracket 10 to a shaft 12 turnably mounted in the machine and carrying a locking bar 11. In the position shown in full lines in Fig. 1 the locking bar 11 prevents any downward movement and operation of the key lever 13. Whenever the solenoid 2 is energized and the armature 3 is moved forward against the action of spring 52, the locking bar 11 is tilted into the idle position shown in dot-dash lines in Fig. 1.

In those cases where the power supply should have been interrupted accidentally while the switch 1 was in closed or "on" position, the locking bar 11 is automatically moved into its locking position as soon as the solenoid 2 is deenergized due to lack of power. When thereafter the power supply is re-established, e.g. by placing the plug into its socket, then first through the energization of the solenoid 2 the locking bar 11 is moved into its idle position. Then, however, the above-described drive means will cause the release pin 51 to move the detent means into not-locking position whereafter, in the manner described above, the switch 1 is moved by the actuating means into its "off" position whereafter the locking bar 11 would immediately return into its locking position. In this manner any inconvenience or damage to the machine that otherwise might occur is safely prevented. The machine is again in correct condition for being started in the regular way by moving the control lever 5 into its "on" position.

Preferably, the arrangement according to the invention is further supplemented by means for disconnecting the power supply from the motor and/or the solenoid of the key locking device, whenever the usual cover is taken from the particular machine. As can be seen in Figs. 1 and 2, in a preferred embodiment of the inveniton the machine is equipped with a controlling lever 41 pivotally mounted in the machine at 40 and having substantially three arms. one arm ending with a tip 39 is adapted to engage the above-mentioned extension 38 of the detent lever 19, a second, shorter arm is connected with a spring 42 serving to urge the tip 39 towards the extension 38, and a third arm 43 adapted to be engaged by a cover 44 placed over the machine. Consequently, when the cover is placed on the machine the tip 39 is moved away from the extension 38. However, as soon as the cover 44 is removed as indicated by the arrow g, the tip 39 is pushed by the action of spring 42 against extension 38 whereby the detent lever 19 is moved into its not-locking position. Thus, also in this case the machine is after this in correct condition for being started.

It should be noted that in certain cases it might be desirable to provide a separate switch for the solenoid. In such cases the arrangement may be modified accordingly without departing from the basic concept of this invention.

It will be understood that the arrangement according to the invention is not limited to office machines having a plurality of key members, but may as well be applied to similar machines having only one key member for operation. Likewise, the invention is not restricted to machines in which both the carriage and the type lever mechanism is operated through an electric motor, as in ordinary electric typewriters, but may also be advantageously applied to those machines in which only the carriage is operated by electrical moving means.

It will be understood that each of the elements described above, or two or more togehter, may also find a useful application in other types of key-operated electric office machines differing from the types described above.

While the invention has been illustrated and described as embodied in an electric typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various appilcations without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an office machine operated by at least one key member and including an electric drive motor, particularly in an electric typewriter-type machine, in combination, circuit means including a switch means connected for controlling said motor and movable between an open and a closed position; actuating means for moving said switch means between said open and closed positions thereof and including bias means for urging said switch means into open position; detent means movable between a locking position and a not-locking position and operatively connected with said actuating means for holding, when in said locking position, said switch means in said closed position against the action of said bias means; and release means for shifting said detent means into its not-locking position, said release means including a releasing member movable between an idle position and a releasing position in which it shifts said detent means into not-locking position, and drive means operatively connected for drive supply with said motor and controllable by said key member so as to continuously move said release member towards said releasing position as long as no key member is operated, but to discontinue said moving of said release member whenever a key member is operated before said detent means have been caused to move into said not-locking position causing said switch means to move into open position.

2. In an office machine operated by a plurality of key members and including an electric drive motor, particularly in an electric typewriter-type machine, in combination, circuit means including a switch means connected for controlling said motor and movable between an open and a closed position; actuating means for moving said switch means between said open and closed positions thereof and including bias means for urging said switch means into open position; detent means movable between a locking position and a not-locking position and operatively connected with said actuating means, for holding, when in said locking position, said switch means in said closed position against the action of said bias means; and release means for shifting said detent means into its not-locking position, said release means including a releasing member movable between an idle position and a releasing position in which it shifts said detent means into not-locking position, and drive means operatively connected for drive supply with said motor and controllable by any one of said key members so as to continuously move said release member towards said releasing position as long as no key member is operated, but to discontinue said moving of said release member whenever a key member is operated before said detent means have been caused to move into said not-locking position causing said switch means to move into open position.

3. In an office machine operated by at least one key member and including an electric drive motor, particularly in an electric typewriter-type machine, in combination, circuit means including switch means connected for controlling said motor and movable between an open and a closed position; first actuating means for moving said switch means between said open and closed positions thereof and including bias means for urging said switch means into open position; detent means movable between a locking position and a not-locking position and operatively connected with said first actuating means for holding, when in said locking position, said switch means in said closed position against the action of said bias means; release means for shifting said detent means into its not-locking position, said release means including a releasing member movable between an idle position and a releasing position in which it shifts said detent means into its not-locking position, and drive means operatively connected for drive supply with said motor and comprising disengageable engagement means capable of establishing a drive connection between said drive means and said releasing member, said drive means being capable of continuously moving said releasing member towards its releasing position when said engagement means are in engaged position; and second actuating means for moving said engagement means into disengaged position, said second actuating means being operatively connected with at least one key member of said machine for being operated for moving said engagement means into disengaged position every time at least one key member is operated, so that if none of said key members is operated while said switch means is in closed position, said detent means is released and the switch means moved to open position, unless before the release of said detent means at least one of said key members is operated and thereby said engagement means is moved in disengaged position and said releasing member is permitted to return to its idle position.

4. In an office machine operated by a set of key members and including an electric drive motor, particularly in an electric typewriter-type machine, in combination, circuit means including switch means connected for controlling said motor and movable between an open and a closed position; first actuating means for moving said switch means between said open and closed positions thereof and including bias means for urging said switch means into open position; detent means movable between a locking position and a not-locking position and operatively connected with said first actuating means for holding, when in said locking position, said switch means in said closed position against the action of said bias means; release means for shifting said detent means into its not-locking position, said release means including a releasing member movable between an idle position and a releasing position in which it shifts said detent means into its not-locking position, and drive means operatively connected for drive supply with said motor and comprising disengageable engagement means capable of establishing a drive connection between said drive means and said releasing member, said drive means being capable of continuously moving said releasing member towards its releasing position when said engagement means are in engaged position; and second actuating means for moving said engagement means into disengaged position, said second actuating means being operatively connected with said set of key members for being operated for moving said engagement means into disengaged position every time at least one key member is operated, so that if none of said key members is operated while said switch means is in closed position, said detent means is released and the switch means moved to open position, unless before the release of said detent means any one of said key members is operated and thereby said engagement means is moved in disengaged position and said releasing member is permitted to return to its idle position.

5. An office machine as set forth in claim 4, including locking means movable between an idle and a locking position for preventing said set of key members from being operable, solenoid means connected with said circuit means for being controlled by said switch means, actuating members operated by said solenoid means for moving said locking means into idle position, and bias means for urging said locking means into locking position when said solenoid means is deenergized.

6. An office machine as set forth in claim 5, in which said solenoid means is connected in parallel with said motor.

7. An office machine as set forth in claim 6, including control means operatively connected with said first actuating means for manually operating said first actuating means.

8. In an office machine operated by a set of key members and including an electric drive motor, particularly in an electric typewriter-type machine, in combination, circuit means including switch means connected for controlling said motor and movable between an open and a closed position; first actuating means for moving said switch means between said open and closed positions thereof and including bias means for urging said switch means into open position; detent means movable between a locking position and a not-locking position and operatively connected with said first actuating means for holding, when in said locking position, said switch means in said closed position against the action of said bias means; release means for shifting said detent means into its not-locking position, said release means including a releasing element having a portion located adjacent to said detent means and movable between an idle position and a releasing position in which it shifts said detent means into its not-locking position, and drive means operatively connected for drive supply with said motor and comprising at least one pair of friction gears, one of said friction gears being located for engaging said releasing element frictionally, disengageable engagement means capable of establishing a drive connection between said one of said friction gears and said releasing element, said drive means being capable of continuously moving said releasing element towards its releasing position when said engagement means is in engaged position; and second actuating means for moving said engagement means into disengaged position, said second actuating means being operatively connected with said set of key members for being operated for moving said engagement means into disengaged position every time at least one key member is operated, so that if none of said key members is operated while said switch means is in closed position, said detent means is released and the switch means moved to open position, unless before the release of said detent means any one of said key members is operated and thereby said engagement means is moved in disengaged position and said releasing element is permitted to return to its idle position.

9. An office machine as set forth in claim 8, wherein said releasing element is a tiltable lever carrying a release pin capable of abutting against said detent means and having an arcuate extension capable of being engaged by said one of said friction gears.

10. An office machine as set forth in claim 9, wherein said first actuating means include first lever means directly operating said switch means, and a control rod linked to said first lever means and equipped with control means for manually operating said switch means, wherein said detent means include a detent lever pivotally mounted on said control rod movable between locking and not-locking positions and having a holding portion for engaging said first lever means so as to hold the latter in a locked position in which said switch means is in closed position, said bias means being operatively connected with said detent lever for urging the latter into its locking position and in addition for urging said control rod, by acting on said detent lever, so as to move said switch means into open position when said detent lever is disengaged from said first lever means and thus in not-locking position.

11. An office machine as set forth in claim 9, said disengageable engagement means including a disengagement lever pivotally mounted in said machine and carrying pivotally said tiltable lever so that when said disengagement lever is moved in one direction said arcuate extension is disengaged from said one of said friction gears, said second actuating means being capable of engaging said disengagement lever for moving it in said one direction, said bias means connecting said first actuating means with said disengagement lever so as to urge the latter in a direction opposite to said one direction for causing engagement between said arcuate extension and said one of said friction gears when said first actuating means is moved into a position causing said switch means to be in closed position.

12. An office machine as set forth in claim 11, wherein said second actuating means include an actuating lever pivotally mounted in said machine for engaging in one position with a portion thereof said disengagement lever for moving the latter in said one direction, and a machine element operated every time any one of said key members is operated, and an operative connection between said machine element and said actuating lever so that whenever any one of said key members is operated said disengagement member is moved in said one direction.

13. An office machine as set forth in claim 12, including locking means movable between an idle and a locking position for preventing said set of key members from being operable, solenoid means connected with said circuit means for being controlled by said switch means, actuating members operated by said solenoid means for moving said locking means into idle position, and bias means for urging said locking means into locking position when said solenoid means is deenergized.

14. An office machine as set forth in claim 13, including a covering hood adapted to be placed over said machine in covering position; a controlling lever pivotally mounted in said machine and having one end adapted to be engaged by said hood when the latter is placed in covering position and to be moved thereby in one direction; bias means urging said controlling lever in opposite direction; the other end of said controlling lever being adapted to engage said first actuating means and to move the latter into a position causing switch means to be in open position whenever said hood is removed from said covering position and said controlling lever is consequently moved in a direction opposite to said one direction.

15. An office machine as set forth in claim 4, including a covering hood adapted to be placed over said machine in covering position; a controlling lever pivotally mounted in said machine and having one end adapted to be engaged by said hood when the latter is placed in covering position and to be moved thereby in one direction; bias means urging said controlling lever in opposite direction; the other end of said controlling lever being adapted to engage said first actuating means and to move the latter into a position causing said switch means to be in open position whenever said hood is removed from said covering position and said controlling lever is consequently moved in said one direction.

References Cited in the file of this patent
UNITED STATES PATENTS

| | | |
|---|---|---|
| 1,557,457 | Hawley | Oct. 13, 1925 |
| 2,602,529 | Smathers | July 8, 1952 |